US012654161B2

(12) United States Patent
Kaufman Rechulski et al.

(10) Patent No.: US 12,654,161 B2
(45) Date of Patent: Jun. 16, 2026

(54) SOLID SHAPED BODY AND USE OF THE SOLID SHAPED BODY

(71) Applicant: BASF SE, Ludwigshafen am Rhein (DE)

(72) Inventors: Marcelo Daniel Kaufman Rechulski, Ludwigshafen am Rhein (DE); Miguel Angel Romero Valle, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 513 days.

(21) Appl. No.: 18/018,049

(22) PCT Filed: Jul. 23, 2021

(86) PCT No.: PCT/EP2021/070653
§ 371 (c)(1),
(2) Date: Jan. 26, 2023

(87) PCT Pub. No.: WO2022/023193
PCT Pub. Date: Feb. 3, 2022

(65) Prior Publication Data
US 2023/0311108 A1 Oct. 5, 2023

(30) Foreign Application Priority Data
Jul. 29, 2020 (EP) .................................... 20188359

(51) Int. Cl.
*B01J 35/55* (2024.01)
*B01J 35/37* (2024.01)
(Continued)

(52) U.S. Cl.
CPC .............. *B01J 35/40* (2024.01); *B01J 35/37* (2024.01); *B01J 35/45* (2024.01); *B01J 35/55* (2024.01);
(Continued)

(58) Field of Classification Search
CPC .. B01J 35/50; B01J 35/40; B01J 35/55; Y10T 428/24273
See application file for complete search history.

(56) References Cited

U.S. PATENT DOCUMENTS 3,918,189 A * 11/1975 Hartog ...................... F41C 3/14
42/67
3,982,346 A * 9/1976 Pilorget .................. F41A 15/02
42/68
(Continued)

FOREIGN PATENT DOCUMENTS

DE 2719543 A1 12/1977
DE 3141942 A1 8/1982
(Continued)

OTHER PUBLICATIONS

[NPL-1] "Reuleaux triangle"; Wikipedia (accessed Nov. 10, 2025); <https://en.wikipedia.org/wiki/Reuleaux_triangle>. (Year: 2025).*
(Continued)

*Primary Examiner* — Donald M Flores, Jr.
(74) *Attorney, Agent, or Firm* — Faegre Drinker Biddle & Reath LLP

(57) ABSTRACT

The invention relates to a solid shaped body (1) having a cylindrical form with a first base area (3), a second base area (5) and a lateral area (7), wherein the solid shaped body (1) comprises a first number of flutes (9) with at least one flute radius (13) in the lateral area (7), each extending from the first base area (3) to the second base area (5), and a second number of openings (11), each extending from the first base area (3) to the second base area (5), wherein the solid shaped body (1) has a cross-sectional area in form of a rholoid (2). The invention further relates to a use of the solid shaped body (1).

13 Claims, 4 Drawing Sheets

(51) Int. Cl.
  *B01J 35/40*     (2024.01)
  *B01J 35/45*     (2024.01)
  *B01J 35/50*     (2024.01)
  *B01J 35/77*     (2024.01)

(52) U.S. Cl.
  CPC ............ *B01J 35/77* (2024.01); *B01J 2235/15*
  (2024.01); *Y10T 428/24273* (2015.01)

(56)            References Cited

U.S. PATENT DOCUMENTS

| | | | |
|---|---|---|---|
| 4,328,130 A | 5/1982 | Kyan | |
| 4,441,990 A | 4/1984 | Huang | |
| 5,097,091 A | 3/1992 | Kremer et al. | |
| 8,206,576 B2 | 6/2012 | Moon et al. | |
| 2005/0212153 A1 * | 9/2005 | Niknafs | B01J 19/30 |
| | | | 261/94 |
| 2006/0204414 A1 * | 9/2006 | Warner | B01J 19/30 |
| | | | 422/211 |
| 2011/0201494 A1 * | 8/2011 | Birdsall | C01B 3/40 |
| | | | 518/700 |
| 2021/0213422 A1 | 7/2021 | Lanver et al. | |

FOREIGN PATENT DOCUMENTS

| | | | |
|---|---|---|---|
| DE | 3935073 A1 | 4/1991 | |
| EP | 2323762 B1 | 7/2016 | |
| EP | 3574994 A1 | 12/2019 | |
| GB | 1513544 A | 6/1978 | |
| RU | 2160629 C2 * | 12/2000 | .............. B01J 19/30 |
| RU | 218794 U1 * | 6/2023 | |
| RU | 219346 U1 * | 7/2023 | |
| WO | 2006/114320 A1 | 11/2006 | |
| WO | 2007/051602 A1 | 5/2007 | |
| WO | 2010/029323 A1 | 3/2010 | |
| WO | 2010/029324 A1 | 3/2010 | |
| WO | 2013/118078 A1 | 8/2013 | |
| WO | 2020/120078 A1 | 6/2020 | |

OTHER PUBLICATIONS

[NPL-2] Голованов Иван Юрьевич (RU 218794 U1); Jun. 13, 2023 (Google Patents machine translation to English). (Year: 2023).*

[NPL-2] Голованов Иван Юрьевич (RU 219346 U1); Jul. 12, 2023 (Google Patents machine translation to English). (Year: 2023).*

[NPL-3] Dehniel (RU 2160629 C2); Dec. 20, 2000 (EPO machine translation to English). (Year: 2000).*

International Preliminary Report on Patentability received for PCT Patent Application No. PCT/EP2021/070653, mailed on Jul. 6, 2022, 4 pages.

International Search Report and Written Opinion received for PCT Patent Application No. PCT/EP2021/070653, mailed on Nov. 12, 2021, 11 pages.

* cited by examiner

SOLID SHAPED BODY AND USE OF THE SOLID SHAPED BODY

CROSS-REFERENCE TO RELATED APPLICATIONS

This application is a National stage application (under 35 U.S.C. § 371) of PCT/EP2021/070653, filed Jul. 23, 2021, which claims benefit of European Application No. 20188359.2, filed Jul. 29, 2020, both of which are incorporated herein by reference in their entirety.

The present invention relates to a solid shaped body having a cylindrical form with a first base area, a second base area and a lateral area, wherein the solid shaped body comprises a first number of flutes in the lateral area, each extending from the first base area to the second base area, and a second number of openings, each extending from the first base area to the second base area. The invention further relates to a use of the solid shaped body as a catalyst.

The performance of solid shaped bodies, especially when used as catalysts, strongly depends on the shape and thus on the geometry of the shaped bodies. Mechanical strength, pressure drop, packing bed density and bed mass diffusion coefficient constitute examples of performance indicators. Further important parameters are the weight of a single solid shaped body, the specific surface area and heat transport as well as mass transport properties.

Solid shaped bodies are for example applied in reforming of hydrocarbons to synthesis gas, in which Ni- or Co-containing oxide-based catalysts can be used.

WO 2013/118078 A1 refers to a hexaaluminate-comprising catalyst for reforming of hydrocarbons and a reforming process. Catalysts are prepared as bulk material, tablets or strands.

EP 2 323 762 B1 describes shaped hydrogenous catalyst bodies possessing an equal number of holes and flutes.

DE 27 19 543 A1 discloses ceramic bodies for an incorporation of a catalyst. Cylinders with a circular outer circumference are illustrated.

DE 39 35 073 A1 discloses a process for catalytic dehydrogenation of hydrocarbons. Catalyst bodies in form of a gear wheel with rectangular cocks are applied.

WO 2007/051602 A1 relates to a shaped catalyst body for preparing maleic anhydride. A shaped catalyst body in form of a prism providing two triangular faces is proposed.

WO 2020/120078 A1 is directed to a catalytic system comprising a tubular reactor and at least one catalyst particle located within the tubular reactor. A relationship between the form of the catalytic particles and the form of the tubular reactor is considered to improve heat transfer conditions.

U.S. Pat. No. 4,441,990 refers to cross-section shapes such as rectangular shaped tubes and triangular shaped tubes, which are employed to form catalytic extrudates which may be used in hydrocarbon processing operations.

DE 31 41 942 A1 is directed to catalytic shaped bodies in form of cylinders, which have a specific circumference with convexities being wider than concavities.

WO 2010/029324 A1 is directed to a catalyst unit comprising a cylinder, which exhibits five holes arranged in a pentagonal pattern as well as five riffles.

WO 2006/114320 A1 describes a cylindrical catalyst member, wherein embossings are provided on the circumferential surface of the catalyst member.

Often, geometries of catalytic solid shaped bodies are optimized with regard to only one performance indicator such as pressure drop or surface area, whereas other performance indicators are rather neglected. It is an objective of the present invention to provide solid shaped bodies, which provide an improvement in at least one performance indicator, whereas at the same time a good performance is shown for remaining performance indicators. Thus, the solid shaped bodies shall offer a directed compromise between various performance indicators comprising pressure drop, surface area, mechanical strength, weight of a single shaped body, packed bed density, specific surface area of the packed bed, heat transport properties and mass transport properties.

This object is achieved by a solid shaped body having a cylindrical form with a first base area, a second base area and a lateral area, wherein the solid shaped body comprises a first number of flutes with at least one flute radius in the lateral area, each extending from the first base area to the second base area, and a second number of openings, each extending from the first base area to the second base area, wherein the solid shaped body has a cross-sectional area in form of a rholoid.

The term rholoid is understood to be an intersection plane, which is formed by three superposed circles, seen in a two-dimensional view. The rholoid comprises three edges, in particular three curved edges, and three corners. Preferably, a length of each of the three edges differ from an arithmetic mean value of the lengths of the three edges by less than 30%, more preferably less than 10% and most preferably less than 5%, based on the arithmetic mean value, respectively. In particular, the center points of the superposed circles are arranged in equidistance to the adjacent center points and thus form an isosceles triangle. Seen in a three-dimensional view, the rholoid body is formed by intersection of three circular cylinders corresponding to the three superposed circles.

The rholoid constitutes the basic shape of the cross-sectional area of the cylindrical shape of the solid shaped body, wherein the first base area and the second base area are preferably arranged in parallel to each other, especially in case of plane base areas, and/or as mirror images, especially in case of curved or domed base areas. The first base area and the second base area are preferably joined by the lateral area. The lateral area comprises the first number of flutes, such that a rholoid circumference of a cross-section of the shaped body is intermitted by the flutes, which can also be referred to as riffles or embossings.

The solid shaped body further comprises the second number of openings, which can also be referred to as holes and which extend through the solid shaped body from the first base area to the second base area. The first number refers to the flutes and the second number refers to the openings. A circumference of the openings in a cross-sectional view is completely surrounded by the shaped body, whereas in contrast thereto, the flutes are solely located at the external circumference of the solid shaped body, being concave parts of the circumference of the solid shaped body.

Preferably, longitudinal axes, more preferable central axes, of the solid shaped body, the flutes and/or the openings, respectively, are arranged in parallel to each other. The term in parallel is understood in that the longitudinal axes, more preferable the central axes, of the solid shaped body, the flutes and/or the openings, respectively, enclose an angle of less than 20°, preferably of less than 10°, more preferably of less than 5° and most preferably of less than 2°.

Preferably, the shaped body comprises 2 to 8, more preferably 3 to 7, in particular 3 openings.

The solid shaped body comprises preferably more flutes than openings. More preferably, a difference between the first number of flutes and the second number of openings is at least 2, most preferably 3. In a particularly preferred embodiment, a ratio between the first number of flutes and the second number of openings is 2. Preferably, the at least one flute radius is in a range from 0.8 mm to 5.0 mm, more preferably from 1.4 mm to 5.0 mm.

Preferably at least one opening has a second radius, more preferably all openings have the second radius, and a ratio between the at least one flute radius and the second radius of the at least one opening is preferably in a range from 0.2 to 5.0. Preferably, a ratio between the at least one flute radius and the diameter of the solid shaped body is in a range from 0.05 to 0.50, more preferably from 0.10 to 0.30.

Preferably, the first number of flutes comprises a third number of first flutes with a third radius and a fourth number of second flutes with a fourth radius, wherein the third radius is smaller than the fourth radius. More preferably, the first number is the sum of the third number and the fourth number. Most preferably, the third number of first flutes is equal to the fourth number of second flutes. In one preferred embodiment, the solid shaped body comprises 6 flutes, comprising 3 first flutes and 3 second flutes, and further preferred, the solid shaped body comprises 3 openings. In particular, each of the first flutes has the third radius and/or each of the second flutes has the fourth radius, respectively. The first flutes and the second flutes are preferably arranged in an alternating manner.

A ratio between the third radius of the first flutes and the second radius of the at least one opening is preferably in a range from 0.2 to 3.0, more preferably from 0.5 to 1.5. Most preferred, the third radius of the first flutes is equal to the second radius of the at least one opening. A ratio between the fourth radius of the second flutes and the second radius of the at least one opening is preferably in a range from 0.3 to 5.0, more preferably from 1.5 to 3.0, most preferably from 1.8 to 2.5.

Further preferably, a ratio between the third radius of the first flutes and the diameter of the solid shaped body is in a range from 0.05 to 0.45, more preferably from 0.05 to 0.15, and/or a ratio between the fourth radius of the second flutes and the diameter of the solid shaped body is in a range from 0.075 to 0.50, more preferably from 0.20 to 0.30. A ratio between the third radius to the fourth radius is preferably in a range from 0.3 to 0.6.

Preferably, the third radius is in a range from 0.8 mm to 5.0 mm, more preferably from 1.4 mm to 2.5 mm, and/or the fourth radius in a range from 1.2 mm to 5.0 mm, more preferably from 3.2 mm to 5.0 mm.

Further, each opening comprises a first center. Center is understood as geometric center. The first center of one of the openings can be located on the central axis of the solid shaped body. Preferably, at least one first center of the openings, more preferably all first centers of all openings, are arranged in the solid shaped body at a first distance from the central axis of the solid shaped body. A ratio between the first distance from the central axis of the solid shaped body to at least one first center of the openings, in particular to all first centers of all openings, and the diameter of the solid shaped body is preferably in a range from 0.00 to 0.40, more preferably from 0.15 to 0.25. The first distance from the central axis of the solid shaped body to the at least one first center, in particular to all first centers of all openings, is preferably in a range from 2.4 mm to 9.0 mm, more preferably from 2.5 mm to 4.0 mm. Most preferably, the first distance is equal for all openings.

Thus, the second number of openings can comprise one central opening, which extends along the central axis of the solid shaped body, and at least one peripheral opening, wherein the second number of openings is preferably the sum of the number of peripheral openings and the central opening. The circumference of the at least one peripheral opening is still completely comprised in the solid shaped body and surrounded by the solid shaped body.

Each opening has preferably a circular cross-section. More preferably, the openings are arranged in equidistance to adjacent peripheral openings and in equidistance to the central axis of the solid shaped body, referring to the first centers of the openings.

Preferably, a ratio between the second radius of the at least one opening and the diameter of the solid shaped body is in a range from 0.01 to 0.50, more preferably from 0.05 to 0.20. More preferably, the second radius is in a range from 0.1 mm to 5.0 mm, even more preferably from 1.4 to 2.5 mm. In particular, the second radius is equal for all openings.

Preferably, the third number of first flutes and the fourth number of second flutes are equal to the second number of openings. More preferably, each of the openings is arranged between two second flutes. Correspondingly, the openings and the second flutes are preferably arranged in separate segments of the cross-section of the solid shaped body, respectively. One opening and one first flutes are arranged preferably in a same segment of the cross-section of the solid shaped body. A segment, where an opening and a first flute are arranged in, can also be referred to as lobe. Preferably, one lobe is arranged between two second flutes and one second flute is arranged between to two lobes. Accordingly, the second flutes and the lobes are preferably arranged on the circumference, and thus on the lateral area, of the solid shaped body in an alternating manner. And further, each lobe comprises preferably one first flute.

The first flutes are preferably arranged in equidistance to adjacent flutes and to the central axis of the solid shaped body and/or the second flutes are preferably arranged in equidistance to adjacent flutes and to the central axis of the solid shaped body.

Each of the first flutes has a second center of their fictive, preferably circular, cross-sectional area and each of the second flutes has a third center of their fictive, preferably circular, cross-sectional area. The second centers and the third centers can be located outside of the solid shaped body, respectively. Preferably, at least one second center of the first flutes, at least one first center of the openings and one point of the central axis of the solid shaped body build one line.

A ratio between a second distance from the central axis of the solid shaped body to the second center of the at least one first flute and the diameter of the solid shaped body is preferably in a range from 0.3 to 0.8, more preferably from 0.4 to 0.6, for example 0.5. The second distance between the second center of the at least one first flute and the central axis of the solid shaped body is preferably in a range from 4 mm to 15 mm, more preferably from 7 mm to 12 mm.

A ratio between a third distance from the central axis of the solid shaped body to the third center of at least one second flute and the diameter of the solid shaped body is preferably in a range from 0.3 to 0.8, more preferably from 0.4 to 0.6, for example 0.5. The third distance between the third center of the at least one second flute and the central axis of the solid shaped body is preferably in a range from 4 mm to 15 mm, more preferably from 7 mm to 12 mm.

Preferably, the second distance is equal for all first flutes and/or the third distance is equal for all second flutes. More preferably, the second distance is equal to the third distance.

Preferably, a ratio between the diameter of the solid shaped body and a height of the solid shaped body is in a range from 0.5 to 4.0, more preferably from 1.5 to 2.5. The diameter of the solid shaped body having a cross-sectional area in form of the rholoid is preferably the diameter of an embracing circle, comprising the three corners of the rholoid. Further, the height of the solid shaped body is preferably understood as a maximum distance between the first base area and the second base area, measured perpendicularly to the base areas.

Preferably, the diameter of the solid shaped body is in a range from 8 mm to 25 mm, more preferably from 10 mm to 22 mm, most preferably from 14 mm to 20 mm. The height of the solid shaped body is preferably in a range from 4.0 mm to 12.5 mm, more preferably from 7.0 mm to 12.0 mm.

The first base area and/or the second base area of the solid shaped body are preferably domed. More preferably, the first base area and the second base area are domed. In particular, a ratio between a dome height, referring to the first base area and/or the second base area, and the diameter of the solid shaped body is in a range from 0.01 to 0.40, more preferably from 0.05 to 0.10. The dome height is preferably in a range from 0.2 mm to 4.0 mm, more preferably from 0.8 mm to 2.0 mm. The dome is understood as top and bottom part, respectively, of the solid shape body, where its surface is curved in two directions. Correspondingly, the dome, and thus the dome height, ends, where the lateral area is curved only in one direction, which is the radial direction referring to the solid shaped body.

The invention further relates to a use of the solid shaped body as a catalyst, preferably for reforming one or more hydrocarbons to a synthesis gas comprising hydrogen and carbon monoxide, preferably in the presence of carbon dioxide, wherein the hydrocarbons are preferably selected from a group consisting of methane, ethane, propane and butane, wherein the hydrocarbons are more preferably methane.

More preferably, the solid shaped body is used in a method for reforming one or more hydrocarbons, preferably methane, to a synthesis gas comprising hydrogen and carbon monoxide, the method comprising (a) providing a reactor comprising a reaction zone which comprises the solid shaped body;
  (b) passing a reactant gas stream into the reaction zone obtained from (a), wherein the reactant gas stream passed into the reaction zone comprises the one or more hydrocarbons, carbon dioxide, and water; subjecting said reactant gas stream to reforming conditions in said reaction zone; and removing a product stream from said reaction zone, said product stream comprising hydrogen and carbon monoxide.

The solid shaped body preferably comprises a mixed oxide. More preferably, the mixed oxide comprises cobalt or the mixed oxide comprises nickel. Further preferably, the mixed oxide comprises oxygen, aluminum, cobalt and at least one rare earth metal such as lanthanum or the mixed oxide comprises oxygen, aluminum, nickel and at least one alkaline earth metal such as magnesium. In Particular, the at least one rare earth metal is lanthanum. In Particular, the at least one alkaline earth metal is magnesium.

It is preferred that from 50 weight-% to 100 weight-%, more preferably from 60 weight-% to 100 weight-%, even more preferably from 70 weight-% to 100 weight-%, further preferably from 80 weight-% to 100 weight-%, in particular from 90 weight-% to 100 weight-%, in particular preferably from 95 weight-% to 100 weight-%, most preferably from 99 weight-% to 100 weight-% of the solid shaped body consist of the mixed oxide and optionally at least one suitable binder. From 99 weight-% to 100 weight-%, even more preferably from 99.5 weight-% to 100 weight-%, most preferably from 99.9 weight-% to 100 weight-% of the solid shaped body can also consist of the mixed oxide.

In the case, where the mixed oxide comprises nickel, the mixed oxide preferably comprises at least nickel-magnesium mixed oxide and magnesium spinel and optionally aluminum oxide hydroxide. The nickel-magnesium mixed oxide has preferably an average crystallite size of $\leq 100$ nm, more preferably $\leq 70$ nm, even more preferably $\leq 50$ nm. The magnesium spinel phase has preferably an average crystallite size of $\leq 100$ nm, more preferably $\leq 70$ nm, even more preferably $\leq 50$ nm. The proportion of nickel in the mixed oxide is preferably in the region of 30 mol-%, more preferably in a range from 6 mol-% to 30 mol-%, the proportion of magnesium is preferably in the range of 8 mol-% to 38 mol-%, more preferably 23 mol-% to 35 mol-%, and the proportion of aluminum is preferably in the range of 50 mol-% to 70 mol-%. The intensity of the diffraction reflection of the mixed oxide at 43.09°2θ is preferably less than or equal to the intensity of the diffraction reflection at 44.82°2θ, with the intensity of the diffraction reflection at 43.08°2θ more preferably being less than the intensity of the reflection at 44.72°2θ.

The solid shaped body can be produced for example as described in EP 3 574 994 A1, especially when the solid shaped body comprises the mixed oxide comprising nickel.

In the case, where the mixed oxide comprises cobalt, a weight ratio of cobalt relative to aluminum, calculated as elements, is preferably at least 0.17:1 in the mixed oxide.

As regards the contents of cobalt, lanthanum and aluminum in the mixed oxide comprised in the solid shaped body, no particular restriction applies. It is preferred that from 6 weight-% to 9 weight-%, more preferably from 6.5 weight-% to 8.5 weight-%, most preferably from 7 weight-% to 8 weight-% of the mixed oxide consist of cobalt, calculated as element. Further, it is preferred that from 15 weight-% to 20 weight-%, more preferably from 16 weight-% to 19 weight-%, most preferably from 17 weight-% to 18 weight-%, in particular from 17.5 weight-% to 17.8 weight-% of the mixed oxide consist of lanthanum, calculated as element. Further, it is preferred that from 33 weight-% to 40 weight-%, more preferably from 34 weight-% to 38 weight-%, most preferably from 35 weight-% to 37 weight-%, in particular from 35.5 weight-% to 36.5 weight-% of the mixed oxide consist of aluminum, calculated as element.

The mixed oxide comprising cobalt may comprise an amorphous phase, one or more crystalline phases, or an amorphous phase and one or more crystalline phases. It is preferred that the mixed oxide comprises one or more crystalline phases, more preferably at least two crystalline phases, most preferably at least three crystalline phases. It is preferred that from 80 weight-% to 100 weight-% of the mixed oxide are in crystalline form, more preferably from 90 weight-% to 100 weight-%, most preferably from 92 weight-% to 100 weight-%.

Further, it is preferred that the mixed oxide comprises one or more of a crystalline phase of $LaCoAl_{11}O_{19}$ and a crystalline phase of $LaAl(Co)O_3$. In the case where the mixed oxide comprises a crystalline phase of $LaCoAl_{11}O_{19}$ and a crystalline phase of $LaAl(Co)O_3$, it is preferred that the weight ratio of $LaCoAl_{11}O_{19}$ relative to $LaAl(Co)O_3$ is in a range of from 5:1 to 30:1, more preferably in a range of from 10:1 to 25:1, most preferably in a range of from 12:1 to 22:1, in particular in a range of from 13:1 to 20:1, for example in a range of from 13:1 to 15:1, determined via XRD. It is particularly preferred that the mixed oxide comprises a further crystalline phase $La(OH)_3$. Further, it is particularly preferred that the mixed oxide comprises a further crystalline phase $LaAlO_3$.

Further, it is preferred that the mixed oxide comprises a further crystalline phase $CoAl_2O_4$. In the case where the mixed oxide comprises at least a crystalline phase of $LaCoAl_{11}O_{19}$ and a crystalline phase $CoAl_2O_4$, it is preferred that a weight ratio of $LaCoAl_{11}O_{19}$ relative to $CoAl_2O_4$ in the mixed oxide is in a range of from 8:1 to 35:1, more preferably in a range of from 10:1 to 30:1, further preferably in a range of from 12:1 to 30:1, in particular in a range of from 15:1 to 27:1, most preferably in a range of from 17:1 to 25:1, for example in a range of from 20:1 to 22:1.

It is preferred that the solid shaped body is a calcined solid shaped body. It is more preferred that the solid shaped body is a calcined solid shaped body, wherein the calcination has been performed in a first alternative in a gas atmosphere having a temperature in a range of from 350° C. to 450° C., preferably in a range of from 390° C. to 410° C. Further, it is preferred that the gas atmosphere comprises oxygen, more preferably is one or more of oxygen, air, or lean air. Preferably, the calcining is performed for 2 h to 10 h.

It is more preferred in a second alternative that the solid shaped body is a calcined solid shaped body, wherein the calcination has been performed in a gas atmosphere having a temperature in a range of from 1100° C. to 1400° C., more preferably in a range of from 1175° C. to 1225° C., wherein the gas atmosphere preferably comprises oxygen, more preferably is one or more of oxygen, air, or lean air. Preferably, the calcining is performed for 2 h to 10 h.

The solid shaped body can be produced for example by a process comprising:
  (i) preparing a mixture comprising a lanthanum salt, a cobalt salt, an oxidic aluminum compound, and an acid, wherein one or more of the lanthanum salt and the cobalt salt, preferably both the lanthanum salt and the cobalt salt, are not a nitrate;
  (ii) preparing a solid shaped body from the mixture obtained from (i), comprising
    (ii.1) subjecting the mixture obtained from (i) to a shaping process, obtaining a first solid shaped body;
    (ii.2) preferably drying the first solid shaped body obtained from (ii.1) in a gas atmosphere;
    (ii.3) calcining the first solid shaped body obtained from (ii.1) or (ii.2), preferably from (ii.2), in a gas atmosphere having a temperature in a range of from 350° C. to 470° C.;
  (iii) preferably subjecting the calcined first solid shaped body obtained from (ii) to a reshaping process, obtaining a second solid shaped body having a geometry different from the geometry of the first solid shaped body;
  (iv) calcining the solid shaped body obtained from (ii) or (iii), preferably from (iii), in a gas atmosphere having a temperature in a range of from 1100° C. to 1400° C., obtaining the solid shaped body comprising the mixed oxide.

It is preferred that preparing the mixture according to (i) comprises kneading the mixture.

Further, it is preferred that subjecting the mixture obtained from (i) to a shaping process according to (ii.1) comprises, more preferably consists of extruding, when the reshaping process in (iii) is performed.

According to a first alternative as regards the drying according to (ii.2), it is preferred that the first solid shaped body is dried in a gas atmosphere, the gas atmosphere preferably having a temperature in a range of from 50° C. to 150° C., more preferably in a range of from 80° C. to 110° C., wherein the gas atmosphere preferably comprises oxygen, more preferably is one or more of oxygen, air, or lean air, wherein the drying according to (ii.2) is performed preferably for 5 h to 25 h.

According to a second alternative as concerns the drying according to (ii.2), it is preferred that the first solid shaped body is dried in a gas atmosphere, the gas atmosphere preferably having a temperature in a range of from 80° C. to 150° C., more preferably in a range of from 90° C. to 140° C., wherein the gas atmosphere preferably comprises oxygen, more preferably is one or more of oxygen, air, or lean air, wherein the drying according to (ii.2) is performed preferably for 0.2 h to 2 h, wherein drying is preferably conducted using a belt dryer.

According to a first alternative as regards the calcining according to (ii.3), it is preferred that the first solid shaped body is calcined in a gas atmosphere having a temperature in a range of from 350° C. to 450° C., more preferably in a range of from 390° C. to 410° C. Further, it is preferred that the gas atmosphere comprises oxygen, more preferably is one or more of oxygen, air, or lean air. Further, the calcining according to (ii.3) is performed preferably for 2 h to 10 h.

According to a second alternative as regards the calcining according to (ii.3), it is preferred that the first solid shaped body is calcined according to (ii.3) in a rotary kiln in a gas atmosphere having a temperature in a range of from 350° C. to 450° C., more preferably in a range of from 390° C. to 410° C. Further, it is preferred that the gas atmosphere comprises oxygen, more preferably is one or more of oxygen, air, or lean air. In the case where the first solid shaped body is calcined according to (ii.3) as disclosed herein, it is preferred that calcining comprises separating carbon dioxide from the gas stream, more preferably with a carbon dioxide washer.

As regards the re-shaping according to (iii), it is preferred that re-shaping according to (iii) comprises crushing the calcined solid shaped body obtained from (ii) and subjecting the obtained crushed material to a re-shaping process, obtaining the second solid shaped body, wherein crushing is more preferably conducted by milling.

In the case where re-shaping comprises crushing the calcined solid shaped body obtained from (ii) and subjecting the obtained crushed material to a re-shaping process for obtaining the second solid shaped body, it is particularly preferred that after crushing the calcined solid shaped body obtained from (ii) and prior to subjecting the obtained crushed material to the re-shaping process according to (iii), the process further comprises preparing a mixture comprising the crushed material and one or more binders, more preferably one or more of graphite, a polysaccharide, a sugar alcohol and a synthetic polymer, even more preferably one or more of graphite, a sugar alcohol, a synthetic polymer, cellulose, a modified cellulose and a starch, most preferably graphite, a sugar alcohol, a synthetic polymer, a microcrystalline cellulose, a cellulose ether, more preferably graphite, sorbitol, mannitol, polyethylene glycol (PEG), polyvinylpyrrolidone (PVP), hydroxypropyl cellulose (HPC) and hydroxypropyl methylcellulose (HPMC). In this regard, it is preferred according to a first alternative that in the mixture, a weight ratio of the one or more binders relative to the crushed material is preferably in a range of from 1:10 to 1:20, more preferably in a range of from 1:12 to 1:18, even more preferably in a range of from 1:13 to 1:17.

According to a second alternative, it is preferred that in the mixture, a weight of the one or more binders calculated with respect to a total weight of the mixture is in a range of from 0.5 weight-% to 10 weight-%, more preferably in a range of from 2 weight-% to 9 weight-%, even more preferably in a range of from 4 weight-% to 8 weight-%, most preferably in a range of from 5 weight-% to 7 weight-%.

Further in the case where re-shaping comprises crushing the calcined solid shaped body obtained from (ii) and subjecting the obtained crushed material to a re-shaping process for obtaining the second solid shaped body, it is preferred that after crushing the calcined solid shaped body obtained from (ii) and prior to the re-shaping process according to (iii), the process further comprises separating the particles of the crushed material according to their size into two or more fractions. Preferably, the fractions of the particles with the smallest size, preferably the fraction of the particles with the smallest size, are/is subjected to the re-shaping process. Preferably, the particles with the smallest size have a maximum diameter of 2.0 mm, more preferably a maximum diameter of 1.5 mm, even more preferably a maximum diameter of 1.0 mm. Fractions with even smaller maximum sizes, such as 0.75 mm or 0.5 mm, are generally conceivable.

In the case where a fraction or fractions of particles which do not have the smallest size is/are separated, it is particularly preferred to crush said fraction or fractions again to separate the fractions of the particles with the smallest size, preferably the fraction of the particles with the smallest size, for subjecting to the re-shaping process according to (iii). In accordance with the above, it is preferred that the particles with the smallest size have a maximum diameter of 2.0 mm, more preferably a maximum diameter of 1.5 mm, even more preferably a maximum diameter of 1.0 mm, whereby fractions with even smaller maximum sizes, such as 0.75 mm or 0.5 mm, are also conceivable.

In the case where re-shaping comprises crushing the calcined solid shaped body obtained from (ii) and subjecting the obtained crushed material to a re-shaping process for obtaining the second solid shaped body, wherein prior to the re-shaping process according to (iii), the process further comprises separating the particles of the crushed material according to their size into two or more fractions, it is preferred that the process further comprises recycling at least a portion of the particles of the fraction or fractions which do not have the smallest size to step (i) of the process, comprising preparing the mixture according to (i) comprising the lanthanum salt, the cobalt salt, the oxidic aluminum compound, the acid, more preferably water, and at least the portion of said fractions.

Further, it is particularly preferred that from 65 weight-% to 95 weight-%, more preferably from 75 weight-% to 95 weight-%, even more preferably from 85 weight-% to 95 weight-% of the mixture prepared in (i) consist of the lanthanum salt, the cobalt salt, the oxidic aluminum compound, the acid, and more preferably water, and from 5 weight-% to 35 weight-%, more preferably from 5 weight-% to 25 weight-%, even more preferably from 5 weight-% to 15 weight-% of the mixture consist of said fractions.

It is particularly preferred that the particles of the fraction or fractions which do not have the smallest size are re-agglomerated, preferably by compaction. More preferably, the obtained reagglomerated particles are recycled in the re-shaping according to (iii). As a first alternative, the obtained re-agglomerated particles are recycled in the re-shaping according to (iii) alone, thus, as calcined first solid shaped body obtained from (ii). As a second alternative, the obtained reagglomerated particles are recycled in the reshaping according to (iii) together with the calcined first solid shaped body obtained from (ii).

Further, it is preferred that the re-shaping process according to (iii) comprises, more preferably consists of tableting.

As regards calcining the solid shaped body obtained from (ii) or (iii) according to (iv), it is preferred that (iv) comprises drying the solid shaped body obtained from (ii) or (iii), more preferably from (iii), prior to calcining, in a gas atmosphere having a temperature in a range of from 50° C. to 250° C., more preferably in a range of from 80° C. to 100° C., wherein the gas atmosphere preferably comprises oxygen, more preferably is one or more of oxygen, air, or lean air, wherein the drying is performed more preferably for 5 h to 22 h.

As regards calcining the second solid shaped body according to (iv), it is preferred that the second solid shaped body is calcined in a gas atmosphere having a temperature in a range of from 1125° C. to 1275° C., more preferably in a range of from 1175° C. to 1225° C., wherein the gas atmosphere more preferably comprises oxygen, more preferably is one or more of oxygen, air, or lean air, wherein the calcining according to (iv) is performed more preferably for 2 h to 10 h.

Moreover, it is preferred that the process for producing the solid shaped body consists of steps (i), (ii), (iii) and (iv), (iv) preferably comprising the drying as described above. In this regard, it is preferred that (i) is more preferably carried out prior to (ii), wherein (ii) is more preferably carried out prior to (iii), wherein (iii) is more preferably carried out prior to (iv), wherein (ii) is more preferably carried out after (i), wherein (iii) is more preferably carried out after (ii), wherein (iv) is more preferably carried out after (iii).

BRIEF DESCRIPTION OF THE DRAWINGS

The present invention is described in more detail at hand of the accompanying drawings, in which:

FIG. 1 shows a longitudinal section of a solid shaped body 1 having a cylindrical form. The solid shaped body 1 comprises a first base area 3 and a second base area 5, which are connected by a lateral area 7. In the illustrative embodiment of FIG. 1, the first base area 3 and the second base area 5 are domed with a dome height 35. Further, the solid shaped body 1 has a height 19 and a diameter 17.

FIG. 2 shows a cross-section of a solid shaped body 1 having a cross-sectional area in form of a rholoid 2. The rholoid 2 is geometrically formed by intersection of three superposed circles 4, each with a circle radius 6, and comprises three edges 8 and three corners 10. The three corners 10 lie on an embracing circle 12 with a diameter 17. The diameter 17 is understood to be the diameter 17 of the solid shaped body 1. The diameter 17 and the circle radius 6 are of a same length.

Figure 3:
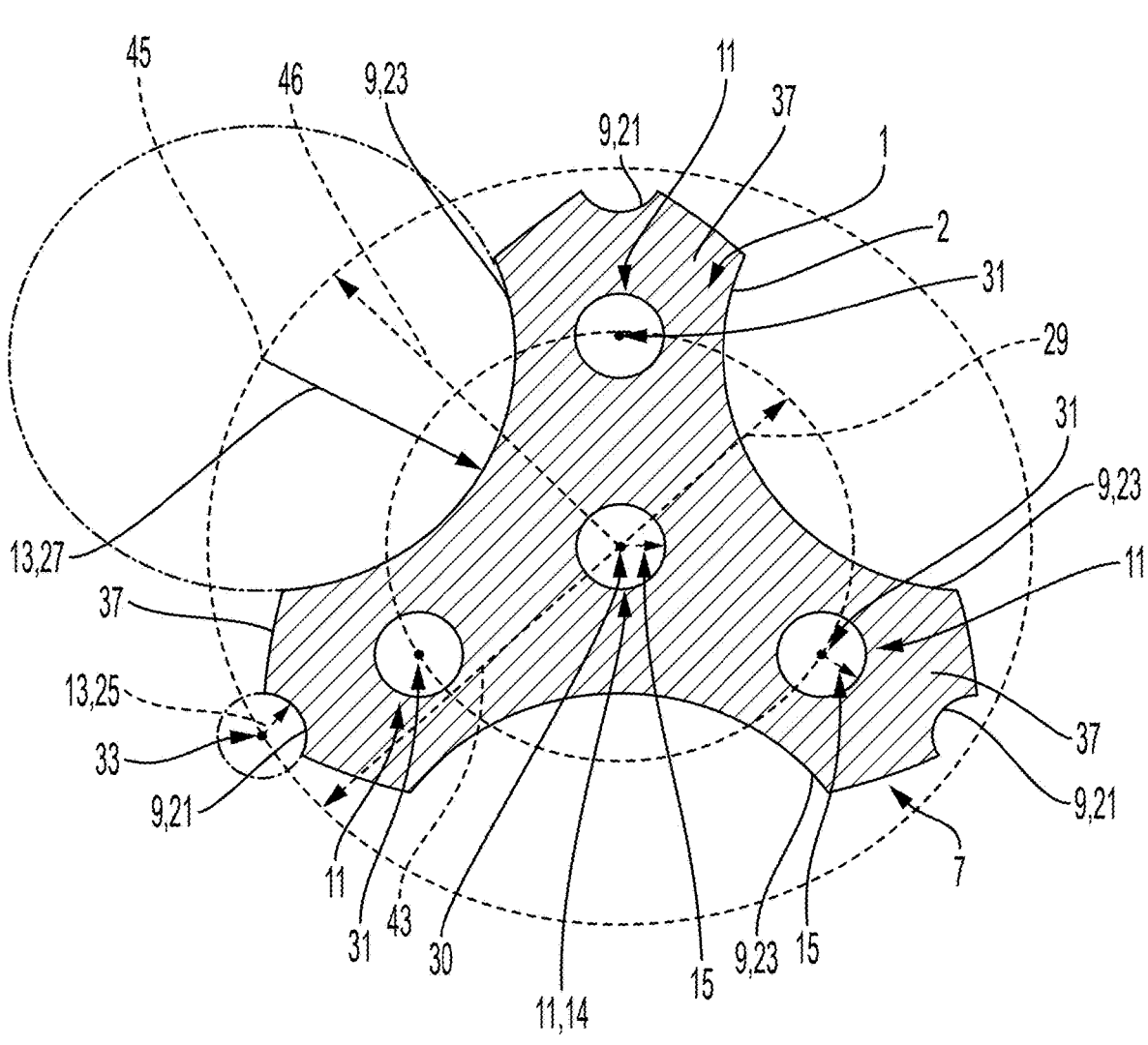
FIG. 3 shows a cross-section of a solid shaped body having a cross-sectional area in form of a rholoid and comprising openings and flutes.

FIG. 3 shows a cross-section of a solid shaped body 1 having a cross-sectional area in form of a rholoid 2 and comprising four openings 11 and six flutes 9 with at least one flute radius 13. The four openings 11 with a second radius 15 comprise one central opening 14. The central opening 14 is located on a central axis 30 of the solid shaped body 1. The flutes 9 are located at the lateral surface 7 of the solid shaped body 1. Further, the flutes 9 and the openings 11 extend from the first base area 3 to the second base area 5 of the solid shaped body 1. First flutes 21 have a third radius 25, which is smaller than a fourth radius 27 of second flutes 23.

Each second flute 23 is arranged between two first flutes 21 and vice versa. Two adjacent second flutes 23 are separated from each other by a lobe 37, which comprises one of the first flutes 21 and also one of the openings 11. Thus, the solid shaped body 1 according to FIG. 3 comprises three lobes 37.

A first distance 29 from the central axis 30 of the solid shaped body 1 to first centers 31 of three of the openings 11 is represented as radius of a circle, on which the first centers 31 are located.

In addition, a second distance 43 from the central axis 30 of the solid shaped body 1 to second centers 33 of the first flutes 21 is equal to a third distance 46 from the central axis 30 of the solid shaped body 1 to third centers 45 of the second flutes 23, in this illustrative embodiment.

The second distance 43 is represented as radius of a circle, on which the second centers 33 of the first flutes 21 are located. The second centers 33 refer to a fictive circle, respectively, of which an arc forms the first flutes 21. Further, the third distance 46 is represented as radius of a circle, on which the third centers 45 of the second flutes 23 are located. The third centers 45 refer to a fictive circle, respectively, of which an arc forms the second flutes 23.

Figure 4:
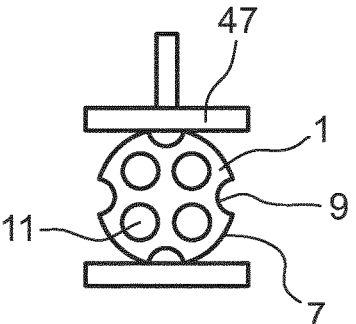
FIGS. 4 to 6 show test set-ups for determination of side crushing strength.
Figure 5:
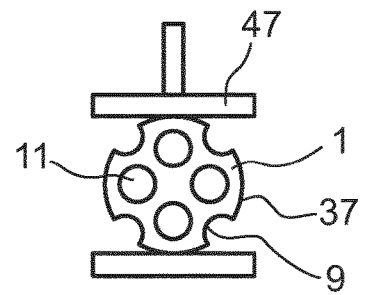
Figure 6:
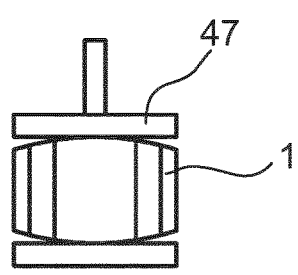

FIGS. 4 to 6 show three different test set-ups for determination of side crushing strength of a solid shaped body 1 with three different positions of the solid shaped body 1 in a testing machine 47. According to FIG. 4 determination of a side crushing strength A is represented. Here, the sample solid shaped body 1 is in a test position standing on a flute 9, specifically on a second flute 23. FIG. 5 illustrates determination of a side crushing strength B, wherein the sample solid shaped body 1 stands on a lobe 37 and is turn by 45° or 60°, respectively, compared the set-up shown in FIG. 4. In case of an odd number of lobes the side crushing strength B corresponds to the side crushing strength A as each lobe is opposing one flute. According to FIG. 6, a side crushing strength C is determined and refers to a position where openings 11 of the solid shaped body 1 are orientated in parallel to the direction of the force applied on the sample solid shaped body 1 during the test by the testing machine 47.

Figure 7:
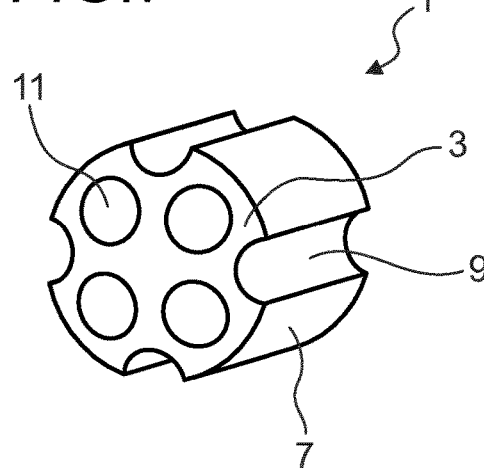
FIGS. 7 and 8 show a perspective view and a cross-section, respectively, of a solid shaped body according to the state of the art.
Figure 8:
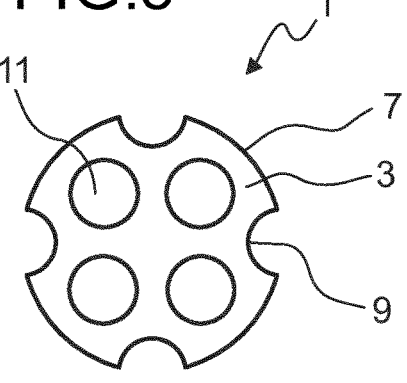

FIG. 7 shows a perspective view of a solid shaped body 1 according to the state of the art and FIG. 8 shows a cross-section of the solid shaped body 1 according to FIG. 7. The solid shaped body 1 comprises four flutes 9 and four openings 11 extending from a first base area 3 through the solid shaped body 1.

Figure 9:
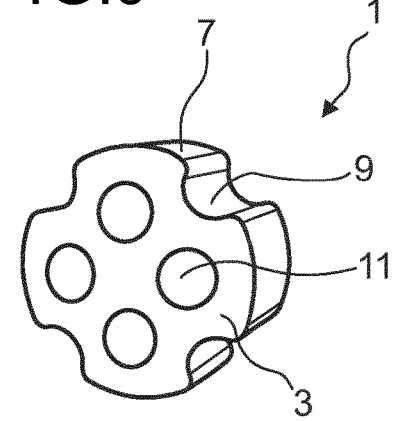
FIG. 9 shows a perspective view of a further solid shaped body according to the state of the art and FIGS. 10 to 12 show different embodiments of solid shaped bodies having a cross-sectional area in form of a rholoid and comprising openings and flutes.

FIG. 9 shows a perspective view of a further solid shaped body 1 according to the state of the art, which also comprises the same number of flutes 9 as openings 11.

Figure 10:
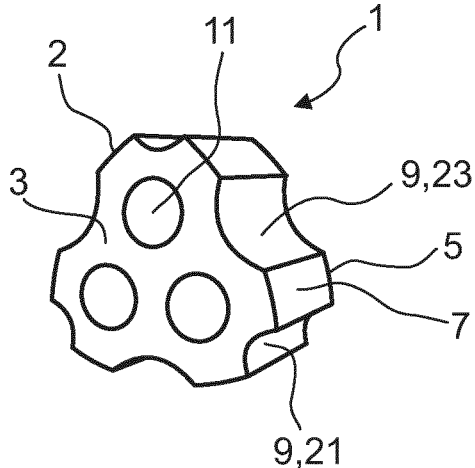
Figure 11:
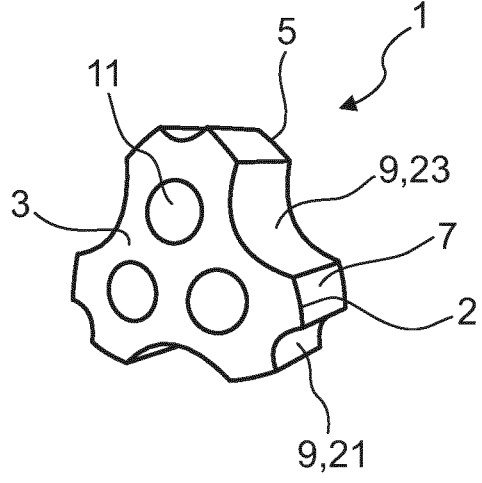
Figure 12:
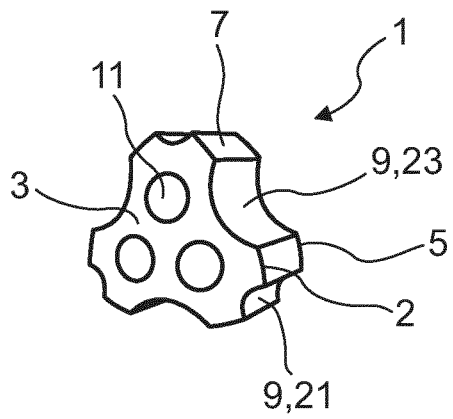

FIGS. 10 to 12 show different embodiments of solid shaped bodies 1 having a cross-sectional area in form of a rholoid 2. Each of the solid shaped bodies comprises three openings 11 and six flutes 9, wherein three flutes 9 are first flutes 21 and three flutes 9 are second flutes 23. All openings 11 have a circular cross-section. Third radii 25 of the first flutes 21 are smaller than fourth radii 27 of the second flutes 23. Further, the openings 11 are arranged in equidistance to adjacent openings 11 and the first flutes 21 and the second flutes 23 are arranged in an alternating manner in the lateral area 7 of the solid shaped body 1.

EXAMPLES AND COMPARATIVE EXAMPLES

Figure 1:
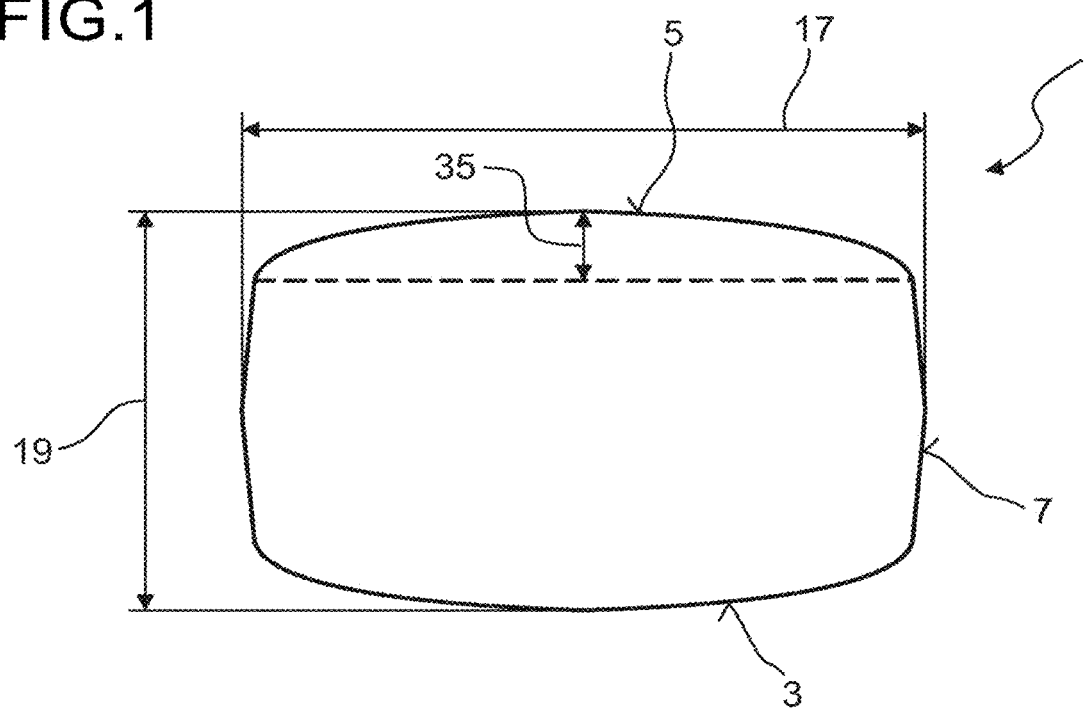
FIG. 1 shows a longitudinal section of a solid shaped body with a cylindrical form.
Figure 2:
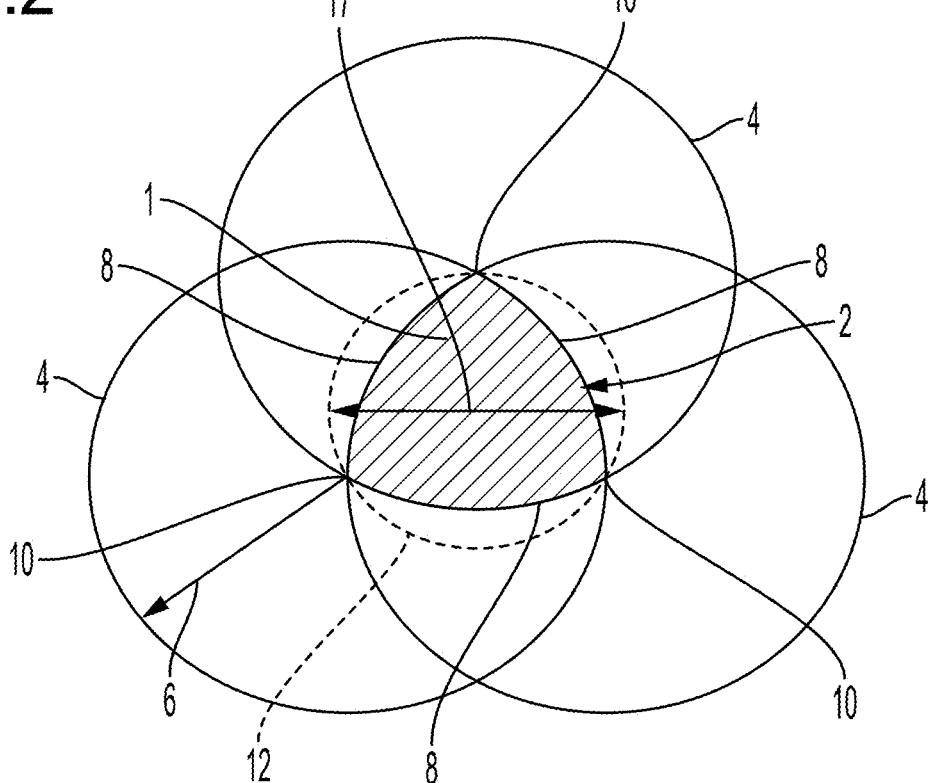
FIG. 2 shows a cross-section of a solid shaped body having a cross-sectional area in form of a rholoid.

Dimensions of solid shaped bodies according to comparative examples 1.1, 1.2, 1.2.1 and 1.2.2 are summarized in table 1. The given reference numerals refer to FIGS. 1 and 3, respectively.

TABLE 1

| Comparative example No. | Reference numeral | Unit | 1.1 | 1.2 | 1.2.1 | 1.2.2 |
|---|---|---|---|---|---|---|
| Diameter | 17 | mm | 13.00 | 16.50 | 14.03 | 12.87 |
| Height | 19 | mm | 17.00 | 10.00 | 8.50 | 7.80 |
| Dome height | 35 | mm | 1.10 | 1.10 | | |
| Flute radius | 13 | mm | 1.50 | 2.05 | | |
| Second distance | 43 | mm | 6.50 | 8.25 | | |
| First distance | 29 | mm | 3.40 | 4.10 | | |
| Second radius | 15 | mm | 1.65 | 1.90 | | |

Dimensions of solid shaped bodies according to examples 2.1 to 2.3, as illustrated in FIGS. 10 to 12, respectively, are summarized in table 2.

TABLE 2

| | Reference numeral | Unit | 2.1 | 2.2 | 2.2.1 | 2.2.2 | 2.3 |
|---|---|---|---|---|---|---|---|
| Diameter | 17 | mm | 19.04 | 19.99 | 16.18 | 14.85 | 19.60 |
| Height | 19 | mm | 9.14 | 9.84 | 7.77 | 7.13 | 11.42 |
| Dome height | 35 | mm | 1.68 | 1.13 | | | 1.13 |
| Second radius | 15 | mm | 1.90 | 2.14 | | | 2.14 |
| Third radius | 25 | mm | 1.90 | 2.14 | | | 2.14 |
| Fourth radius | 27 | mm | 4.74 | 4.74 | | | 4.23 |
| First distance | 29 | mm | 3.42 | 3.42 | | | 3.76 |
| Second distance | 43 | mm | 9.52 | 9.99 | | | 9.80 |
| Third distance | 46 | mm | 9.52 | 9.99 | | | 9.80 |

For all examples and comparative examples the surface, volume and relative weight of the respective solid shaped body were calculated and are summarized in table 3. The volume indicates the volume, which is filled with material, thus the total outer volume of the solid shaped body subtracting an inner volume of the openings and flutes.

The geometric surface and geometric volume of each solid shaped body were determined from CFD (Computational Fluid Dynamics) simulations based on CAD (Computer Aided Design) models of each solid shaped body geometry.

13

TABLE 3

| Nb. | Surface (m²) | Volume (m³) | Relative weight |
|---|---|---|---|
| 1.1 | $1.53 \cdot 10^{-3}$ | $1.36 \cdot 10^{-6}$ | 1.07 |
| 1.2 | $1.19 \cdot 10^{-3}$ | $1.26 \cdot 10^{-6}$ | 1.00 |
| 1.2.1 | $0.86 \cdot 10^{-3}$ | $0.80 \cdot 10^{-6}$ | 0.63 |
| 1.2.2 | $0.72 \cdot 10^{-3}$ | $0.62 \cdot 10^{-6}$ | 0.49 |
| 2.1 | $1.29 \cdot 10^{-3}$ | $1.38 \cdot 10^{-6}$ | 1.09 |
| 2.2 | $0.98 \cdot 10^{-3}$ | $0.96 \cdot 10^{-6}$ | 0.76 |
| 2.2.1 | $0.71 \cdot 10^{-3}$ | $0.59 \cdot 10^{-6}$ | 0.47 |
| 2.2.2 | $0.60 \cdot 10^{-3}$ | $0.46 \cdot 10^{-6}$ | 0.36 |
| 2.3 | $1.15 \cdot 10^{-3}$ | $1.16 \cdot 10^{-6}$ | 0.92 |

Resulting properties of the solid shaped bodies are summarized in table 4, which represent calculated values.

The pressure drop for each solid shaped body geometry was calculated via numerical flow simulation, which describes the flow in spaces between solid shaped bodies of a bed of solid shaped bodies. The procedure comprised three consecutive steps. First, a CAD model of each solid shaped body was created. A tube with an internal diameter of a typical technical reactor of ca. 100 mm was assumed as an outer container comprising the bed of the solid shaped bodies. Both the digital container geometry and the digital geometry of the solid shaped body were fed into a simulation program which allowed to calculate the arrangement of the solid shaped bodies as filled into the container, using Newton's equations of motion.

Pressure drop calculations were performed with air at ambient temperature and Pressure drop calculations were performed with air at ambient temperature and at a superficial velocity of 1 m/s in a DN100 tube. Literature values for air at a constant operating pressure of 1 bar and a temperature of 20° C. were used for the thermodynamic and transport properties of the gas.

In order to calculate the side crush strength (SCS), also referred to as crushing strength, of each solid shaped body, a numerical method such as Finite Element Analysis was used to simulate a side crush strength test applying each CAD model of the solid shaped bodies, based on alumina.

For the minimum SCS/particle volume, the lowest of the determined crushing strength was divided by the volume of the solid shaped body. The axial dispersion coefficient was calculated according to Levenspiel, The Chemical Reactor Omnibook, 4. Edition, Chapter 64, 1993 using "Small Deviation from Plug Flow", wherein for an ideal plug flow reactor $D_{ax} \rightarrow 0$.

14 of example 2.2 to represent different levels of shrinkage. Further, the pressure drop was decreased for examples 2.1 and 2.3. The axial dispersion coefficient was increased over comparative example 1.2, 1.2.1 and 1.2.2, respectively.

Resulting properties of the solid shaped bodies were further studied at hand of 3D-printed representative solid shaped bodies prepared from $CaSO_4$.

The 3D-printed solid shaped bodies were manufactured with a 3D-printer using a Z Corporation Spectrum Z510 model. The solid shaped bodies of a constant composition, also referred to as tablets, were made of a mixture comprising gypsum ($CaSO_4$) using commercial VisiJet PXL Core by 4Dconcepts and a binder using commercial VisiJet PXL Binder by 4Dconcepts. During the 3D-printing process individual solid shaped bodies were not in contact with neighboring solid shaped bodies and all shaped bodies were oriented in such a way that the openings of the solid shaped bodies extended vertically through the shaped bodies. 3D-printing was carried out with a 3D-printing layer thickness of 0.1 mm. Typically, around 200 layers were applied to complete one solid shaped body and around 100 solid shaped bodies were 3D-printed in one experiment. After completing the 3D-printing process, the printed solid shaped bodies were allowed to stay for 1 h in the printing chamber and the build envelope, respectively. Afterwards the solid shaped bodies were removed individually by hand and cleaned from residual powder.

The 3D-printed solid shaped bodies were analyzed according to the following measurement methods. Results of the measurements are summarized in table 5. For comparative example 1.2, three different sizes of the solid shaped body, were investigated. The respective solid shaped bodies were scaled down to different levels of shrinkage.

The side crush strength of the 3D-printed shaped bodies was determined experimentally using a commercial material testing machine of the type BZ2.5/TS1S from Zwick, which allowed testing of the mechanical properties according to DIN EN ISO 7500-1:2018-06. For each type of solid shape body, 10 individual solid shape bodies were investigated. The applied analysis method included a preload of 0.5 N and a preload velocity of 10 mm/min. Analysis velocity was 1.6 mm/min. The solid shaped bodies were tested, whereby three positions were investigated allowing determination of side crushing strength A, side crushing strength B and side crushing strength C, as illustrated in FIGS. 4 to 6.

TABLE 4

| Nb. | Crushing strength A (N) | Crushing strength B (N) | Minimum SCS/particle volume (N/m³) | Relative packed bed density | Pressure drop (Pa/m) | Specific surface area (m²/m³) | Axial dispersion coefficient (m²/s) |
|---|---|---|---|---|---|---|---|
| 1.1 | 389 | 174 | $1.28 \cdot 10^{+8}$ | 0.94 | 851 | 423 | $1.55 \cdot 10^{-2}$ |
| 1.2 | 301 | 139 | $1.10 \cdot 10^{+8}$ | 1.00 | 816 | 371 | $1.18 \cdot 10^{-2}$ |
| 1.2.1 | 228 | 105 | $1.31 \cdot 10^{+8}$ | 1.02 | 949 | 452 | $1.02 \cdot 10^{-2}$ |
| 1.2.2 | 204 | 96 | $1.56 \cdot 10^{+8}$ | 1.01 | 975 | 486 | $1.23 \cdot 10^{-2}$ |
| 2.1 | 228 | — | $1.65 \cdot 10^{+8}$ | 0.92 | 795 | 347 | $1.43 \cdot 10^{-2}$ |
| 2.2 | 183 | — | $1.91 \cdot 10^{+8}$ | 0.92 | 856 | 381 | $1.21 \cdot 10^{-2}$ |
| 2.2.1. | 140 | — | $2.37 \cdot 10^{+8}$ | 0.94 | 1160 | 457 | $1.05 \cdot 10^{-2}$ |
| 2.2.2 | 125 | — | $2.74 \cdot 10^{+8}$ | 0.95 | 1414 | 504 | $1.01 \cdot 10^{-2}$ |
| 2.3 | 198 | — | $1.71 \cdot 10^{+8}$ | 0.90 | 817 | 362 | $1.29 \cdot 10^{-2}$ |

Results according to table 4, which were derived from the modeled solid shaped bodies, show that the axial dispersion coefficient was enhanced for the examples with respect to the comparative examples, corresponding the same geometric scale, whereas examples 2.2.1 and 2.2.2 are scale-downs The diameter and the height of the individual solid shaped bodies were determined by means of a caliper. The weight of the solid shaped bodies was determined by an analysis balance. Typically, 10 shaped bodies were analyzed and the average value was considered.

TABLE 5

| Nb. | Diameter (mm) | Height (mm) | Weight (g) | Crushing strength A (N) | Crushing strength B (N) | Crushing strength C (N) |
|---|---|---|---|---|---|---|
| 1.2 | 16.69 | 9.96 | 1.52 | 38 | 28 | 243 |
| 1.2.1 | 14.20 | 8.72 | 1.12 | 76 | 33 | 162 |
| 1.2.2 | 13.03 | 7.97 | 0.87 | 70 | 37 | 150 |
| 2.1 | 15.35 | 11.61 | 1.96 | 73 | — | 244 |
| 2.2. | 14.70 | 9.27 | 1.27 | 33 | — | 178 |

The analysis of the 3D-printed samples showed an improvement of at least one of the three tested side crushing strengths for example 2.1, whereas example 2.2 is characterized by a high minimum SCS/particle volume as shown in table 4.

REFERENCE NUMERALS

1 Solid shaped body
2 Rholoid
3 First base area
4 Circle
5 Second base area
6 Circle radius
7 Lateral area
8 Edge
9 Flute
10 Corner
11 Opening
12 Embracing circle
13 Flute radius
14 Central opening
15 Second radius
17 Diameter of the solid shaped body 1
19 Height of the solid shaped body 1
21 First flute
23 Second flute
25 Third radius of first flutes 21
27 Fourth radius of second flutes 23
29 First distance
30 Central axis of the solid shaped body 1
31 First center of openings 11
33 Second center of first flutes 21
35 Dome height
37 Lobe
43 Second distance
45 Third center of second flutes 23
46 Third distance
47 Testing machine

The invention claimed is:

1. A solid shaped body having a cylindrical form with a first base area, a second base area and a lateral area,
   wherein the solid shaped body comprises a first number of flutes with at least one flute radius in the lateral area, each extending from the first base area to the second base area,
   wherein the first number of flutes is larger than the second number of openings, and
   a second number of openings, each extending from the first base area to the second base area,
   wherein the solid shaped body has a cross-sectional area in the form of a rholoid.

2. The solid shaped body according to claim 1, wherein the second number of openings is in a range from 2 to 8.

3. The solid shaped body according to claim 1, wherein a ratio between the first number of flutes and the second number of openings is 2.

4. The solid shaped body according to claim 1, wherein the solid shaped body comprises 6 flutes and 3 openings.

5. The solid shaped body according to claim 1, wherein a ratio between a diameter of the solid shaped body and a height of the solid shaped body is in a range from 0.5 to 4.0.

6. The solid shaped body according to claim 1, wherein at least one opening has a second radius and a ratio between the second radius of the at least one opening and the diameter of the solid shaped body is in a range from 0.01 to 0.50.

7. The solid shaped body according to claim 1, wherein the first number of flutes comprises a third number of first flutes with a third radius and a fourth number of second flutes with a fourth radius, wherein the third radius is smaller than the fourth radius.

8. The solid shaped body according to claim 7, wherein a ratio between the third radius of the first flutes and the diameter of the solid shaped body is in a range from 0.05 to 0.45 and/or
   a ratio between the fourth radius of the second flutes and the diameter of the solid shaped body is in a range from 0.075 to 0.50.

9. The solid shaped body according to claim 7, wherein the third number of first flutes is equal to the fourth number of second flutes.

10. The solid shaped body according to claim 7, wherein each of the openings is arranged between two second flutes.

11. The solid shaped body according to claim 1, wherein a ratio between a first distance from a central axis of the solid shaped body to at least one first centre of the openings and the diameter of the solid shaped body is in a range from 0.00 to 0.40.

12. The solid shaped body according to claim 1, wherein the first base area and/or the second base area are domed and a ratio between a dome height and the diameter of the solid shaped body is in a range from 0.01 to 0.40.

13. The solid shaped body according to claim 1, wherein the solid shaped body comprises a mixed oxide and
   the mixed oxide comprises oxygen, aluminum, cobalt and at least one rare earth metal, or
   the mixed oxide comprises oxygen, aluminum, nickel and at least one alkaline earth metal.

* * * * *